United States Patent Office 3,220,975
Patented Nov. 30, 1965

3,220,975
TRI-ISOAMYLAMINE CATALYST IN A PROCESS FOR PREPARING A POLYCARBONATE
Charles J. Fox, Rochester, N.Y., assignor to Eastman Kodak Company, Rochester, N.Y., a corporation of New Jersey
No Drawing. Filed Mar. 19, 1959, Ser. No. 800,379
1 Claim. (Cl. 260—47)

This invention relates to the use of tributylamine and certain homologs as catalysts in a process for the preparation of linear highly polymeric polyesters derived from bisphenols and carbonyl dichloride compounds such as phosgene and various aliphatic and aromatic dicarbonyl dichlorides.

Linear polycarbonates of the broad class with which this invention is concerned have been disclosed in the prior art and a number of different processes known for their preparation. Improvements in such processes for preparing such polycarbonates are disclosed in a copending application filed by Laakso, Buckley and King, Serial No. 798,821 dated March 12, 1959, now U.S. Patent 3,110,698. The present invention represents a further improvement with respect to the subject matter of this copending application. Reference is made to this copending application for a complete discussion of the prior art and the various ramifications of the process being improved upon by the present invention.

As disclosed in the Laakso, Buckley and King application the polymerization process for the prepartion of linear high molecular weight polyesters including polycarbonates using a two-phase reaction mixture can be advantageously accomplished employing trialkylamine catalysts. According to this general concept it would appear that many of the trialkyl amine catalysts were substantially equivalent to each other and that triethylamine is representative of such a catalyst and possesses properties which could be expected to characterize other catalysts of this class.

The present invention centers around the use of tri-n-butylamine and certain substituted tri-n-butyl amines as exceptionally effective catalysts for the preparation of polycarbonates or polyesters from bisphenols and phosgene or other bis acid chlorides. This is a principal object of the present invention. An especially efficacious substituted tri-n-butylamine is tris-isoamylamine.

An additional object of this invention is to provide a process for making effective use of these improved catalysts in the preparatory of polyesters including polycarbonates.

A further object of this invention is to provide a process which can be quite carefully regulated or controlled so as to result in the formation of polycarbonates having inherent viscosities within close limits such as the preparation of a polycarbonate with an inherent viscosity of 1.35 to 1.42 whereby the polymer can be used to produce especially valuable film useful as a photographic base for black-and-white or color type photographic emulsions.

Further objects of this invention will become apparent elsewhere herein.

The rather critical nature of various catalysts which can be employed in the preparation of polyesters contemplated by this invention is illustrated by the following Table I showing an evaluation of various tertiary amines as catalysts for the preparation of polycarbonates. This table is based upon the effectiveness of the named catalysts in using the following method:

A solution of 57 g. of Bisphenol A in 400 ml. of methylene chloride and 300 ml. of water contatining 29 g. of sodium hydroxide was stirred rapidly and 28 g. of phosgene previously dissolved in 150 ml. of methylene chloride was added during 20 minutes. Stirring was continued 10 minutes after the addition. Twenty-five ml. portions of the resulting emulsion were treated with 5 drops each of various tertiary amines. The inherent viscosities of the resulting polymers measured in chloroform are tabulated in Table I.

TABLE I

*Evaluation of tertiary amines as catalysts for preparation of polycarbonates*

| Catalyst: | I.V. in $CHCl_3$ |
|---|---|
| (1) Tri-n-butylamine | 2.1 |
| (2) N,N-dimethyloctadecylamine | 0.48 |
| (3) 4-di-n-butylaminobutylamine | 0.36 |
| (4) N,N-dimethylbenzylamine | 0.49 |
| (5) N,N-dimethylaniline | 0.31 |
| (6) N-methylpiperazine | 0.23 |
| (7) 3,6-diaza-3,6-dimethyloctane - 1,8 - bis(dimethylamine) | 0.42 |
| (8) N,N-dimethylethanolamine | 0.22 |

As can be seen from this table tri-n-butylamine produced outstanding results. The data presented involves a process for producing a prepolymer having low molecular weight after which the catalyst is added and the prepolymer is converted into a highly polymeric linear polycarbonate. Table II below presents further data as to other methods of polymerization.

From this discussion it is apparent that the one aspect of the improvement represented by this invention is concerned with the treatment of prepolymers to form highly polymeric polycarbonates. A further aspect relates to a continuous process which is set forth in considerable detail in a copending application filed by Humphlett and Allen Serial No. 799,436, dated March 16, 1959, now U.S. Patent 3,133,044. This latter application describes and claims a process for preparing prepolymers as well as the high molecular polycarbonates which can be produced from such prepolymers. It is not believed advantageous to engage in a detailed repetition of the disclosures set forth in the Humphlett and Allen application.

The discoveries of Laakso et al. and Humphlett et al. with regard to the use of triethylamine and other trialkyl amines as catalysts in the processes covered in those applications included the discovery that it is often advantageous to omit any of the formerly used quaternary ammonium catalysts.

Due to the unpredictability of results which are obtained according to the great number of variations in the process and catalysts employed it is impossible to conclude that any particular catalyst will be useful with improved results, or poorer results until after the catalyst has actually been tried. The results achieved with regard to a particular process in which the catalyst is tried is not necessarily indicative of what will be found as to other processes or variations of the processes. From this it is apparent that there is an unobviously superior utility in employing tri-n-butylamine and tri-isoamyl amine in processes where a prepolymer of either a batch process or continuous process is being polymerized to form a high molecular weight polymer. The catalytic superiority of tri-isoamyl amine is an especially unobvious feature of this invention.

It has also been found that a modified process using tri-n-butylamine or tri-isoamyl amine as a catalyst is capable of permitting using phosgene gas directly in the polymerization whereby it was possible to (1) eliminate the time consuming step of dissolving phosgene into methylene chloride or other inert solvent either prior to or during the polymerization process, and (2) eliminate or greatly reduce the induction period for buildup in molecular weight by using the phosgene as it is introduced. Hence, it was found that by using tri-n-butylamine, or even more particularly tri-isoamyl amine, phosgene gas could be introduced at a rate of about 0.28 moles per mole of Bisphenol A per minute. Even at considerably higher rates of introducing phosgene gas none was detected in the exit gas. Moreover, the buildup in molecular weight was substantially complete within 10 minutes after adding the phosgene in a batch reaction.

It was also found that by limiting the amount of excess sodium hydroxide to 25 mole percent it was possible to automatically and consistently terminate the polymerization and obtain a polycarbonate of Bisphenol A and phosgene with an inherent viscosity (I.V.) measured at 25° C. using solutions of 2.5 grams of polymer per liter of chloroform of 1.36 to 1.42 (using tri-n-butylamine) which I.V. was considered advantageous for use in forming a film useful as a photographic emulsion support. It was further found that when the excess alkali was reduced to 12% the I.V. was reduced to 0.5 and when increased to the most formerly desirable value of 42.5% the I.V. increased to 1.6 or higher.

These unobvious discoveries were found to be useful not only with regard to batch reactions using a two-phase agitated mixture in a suitable vessel as described in the above-mentioned Laakso et al. application but could also be applied in the continuous process described in the above-mentioned Humphlett et al. application.

In addition to tri-n-butylamine other trialkyl amines were examined for use in this process employing approximately 25% excess sodium hydroxide and phosgene gas at about 0.28 moles per mole of Bisphenol A per minute. It was found that tri-isoamyl amine was unexpectedly superior to tri-n-butylamine. Both of these trialkyl amines have straight four-carbon chain alkyl groups. It was found that by shortening the carbon chain to three and lengthening it to five as in tri-n-propyl or tri-n-amylamine that the catalytic activity was seriously reduced. Some of the results obtained are summarized in Table II.

TABLE II

*Comparison of trialkyl amines as catalysts using phosgene gas*

| Catalyst | I.V. in CHCl₃ | |
| --- | --- | --- |
| | Induction 10 Min. | Induction 30 Min. |
| Triethylamine | (No increase after 45 min.) | |
| Tri-n-propylamine | 0.96 | 0.93 |
| Tri-n-butylamine | 1.42 | 1.38 |
| Tri-n-amylamine | 0.65 | 1.10 |
| Tri-isoamyl amine | 1.57 | 1.57 |

The surprising efficacy and unobvious properties of tri-isoamyl amine clearly represent unexpected superiority over all the other tri-alkylamines.

The data presented in Table II showing the effectiveness of tri-n-butylamine and 25% excess sodium hydroxide was obtained as shown in the following example which serves to further illustrate the present invention.

EXAMPLE 1.—PREPARATION OF POLYCARBONATE USING TRI-n-BUTLYAMINE AND 25 WEIGHT PERCENT EXCESS SODIUM HYDROXIDE

A solution of 50 g. (25 weight percent excess) of sodium hydroxide in 600 ml. of water was added to a suspension of 1.14 g. Bisphenol A in 1000 ml. of methylene chloride. The mixture was cooled to 18° by running water while stirring vigorously and 1 g. tri-n-butylamine was added. Fifty-five grams of phosgene gas were introduced at a constant rate during 4 minutes (0.28 mole/mole Bisphenol A/minute) using a sintered glass bubbler. The phosgene was measured by loss in weight of the cylinder. The temperature increased gradually to 35° C. No loss of phosgene from the mixture was detected. Samples were taken from the mixture, washed with water, precipitated into methanol and dried. Ten minutes after the addition of phosgene, the inherent viscosity of the polycarbonate in chloroform was 1.41.

EXAMPLE 2.—PREPARATION OF POLYCARBONATE USING TRI-ISOAMYL AMINE AND 25 WEIGHT PERCENT SODIUM HYDROXIDE

The polymerization was carried out as when tri-n-butylamine was used according to Example 1 except that 1 g. tri-isoamyl amine was used as the catalyst. The initial temperature was 150° C. and increased to 30°. Ten minutes after the addition of the phosgene was complete, the inherent viscosity of the polycarbonate in chloroform was 1.57 and remained constant after stirring an additional 30 minutes. The Hinsberg test indicated there was no primary or secondary amine present in the tri-isoamyl amine.

The data shown in Table II as regards triethyl amine was obtained using the same process as described in Example 1 except that one gram of triethyl amine was added as a catalyst. Although an increase in temperature to 35 was observed and the pH remained greater than 12, no appreciable increase in viscosity was obtained.

The data regarding the effectiveness of tri-n-propylamine and tri-n-amylamine were also obtained in accordance with the same process except that one gram of the respective triamines was employed. In both cases the Hinsberg test indicated that there was no primary or secondary amine in the trialkyl amine being used. The following examples will serve to further illustrate the invention using different proportions of excess sodium hydroxide.

EXAMPLE 3.—PREPARATION OF POLYCARBONATE USING TRI-n-BUTLYAMINE AND 42.5 PERCENT EXCESS SODIUM HYDROXIDE

The polymerization was carried out as when 25 percent sodium hydroxide was used, except 57 g. (42.5 weight percent excess) of sodium hydroxide was used. Thirty minutes after the addition of phosgene was complete the inherent viscosity of the polycarbonate in chloroform was 1.52. After stirring an additional thirty minutes the inherent viscosity was 1.56.

EXAMPLE 4.—PREPARATION OF POLYCARBONATE USING TRI-n-BUTYLAMINE AND 12.5 PERCENT EXCESS SODIUM HYDROXIDE

The polymerizations were carried out as when 25 percent sodium hydroxide was used, except that 44 to 45 g. sodium hydroxide (12.5 weight percent excess) was used. Ten minutes after the addition of phosgene was complete the inherent viscosity of the polycarbonate in chloroform was 0.50 and increased only to 0.54 during the next thirty minutes.

Although this invention has applications with regard to the polymerization of prepolymers as discussed hereinabove, the especially preferred procedure according to this invention is a batch process which comprises the addition of phosgene gas to a two-phase system of methylene chloride and water containing a bisphenol such as Bisphenol A and a predetermined quantity of excess sodium hydroxide with a trialkylamine catalyst wherein the alkyl radicals each contain a four-carbon chain. Quite a number of variations can be introduced including the use of other carbonyl chlorides besides phosgene such as adipyl dichloride, glutaryl dichloride, sebacyl dichloride or mixtures of such dichlorides with each other or with phosgene as, for example, dissolving such carbonyl chlorides with or without phosgene in a solvent such as methylene chloride. Other variations are apparent from the disclosures set forth in the above mentioned Laakso et al. application. The most advantageous results achieved in accordance with this invention are accomplished with the use of phosgene gas since the catalysts of this invention permit the gas to be introduced at an unusually high rate without necessity for dissolving the gas in a solvent ahead of time. In contrast, the prior art methods are quite slow and involve an induction period which introduces a time lag of considerable proportions before a suitable molecular weight can be achieved. This is quite undesirable when large amounts of material are involved.

One great advantage achieved in accordance with the preferred embodiments of the present invention is that by using a limited amount of alkali the polymerization reaction automatically comes to a stop when a suitable degree of polymerization is obtained and there is no need to continually measure the viscosity during the polymerization. This is a very practical advantage and can be achieved since the catalysts are so unexpectedly rapid in their catalytic activity. Hence it is unnecessary to stop the polymerization by the usual acidification step and the acidification step may be accomplished, if it is desired, at any convenient time. Thus, the acidification can be dispensed with and the two-phase mixture can be laved in accordance with the technique described in the Laakso et al. application to obtain a film-forming dope of excellent commercial utility.

The following example serves to further illustrate that aspect of the invention involving the polymerization of a prepolymer. The product obtained is that identified in Table I as having an inherent viscosity of 2.1.

EXAMPLE 5.—PREPARATION OF A POLYCARBONATE BY POLYMERIZATION OF A PREPOLYMER OF BISPHENOL A AND PHOSGENE USING TRI-n-BUTYLAMINE AS CATALYST

A solution of 29 g. sodium hydroxide in 300 ml. water was added to a suspension of 57 g. Bisphenol A in 400 ml. methylene chloride and the mixture was stirred vigorously. A solution of 27.5 g. phosgene in 150 ml. methylene chloride was added to the mixture during 20 minutes and stirring was continued for 10 minutes, after the addition. To a portion of the resulting emulsion a few drops of tri-n-butylamine was added. The viscosity of the emulsion increased rapidly. After washing the methylene chloride layer with water the polymer was precipitated into methanol and dried. The inherent viscosity of the polymer in chloroform was 2.10.

The following examples illustrate additional variations.

EXAMPLE 6

The process described in Example 5 can be repeated except that the Bisphenol A is replaced with an equimolecular proportion of tetrachloro Bisphenol A otherwise known as 2,2-bis(3,5 - dichloro - 4,4 - hydroxyphenyl)propane. The polymer can be obtained in a manner analagous to that described in Example 5 and leeched again in fresh methanol to remove residual methylene chloride. The resulting pure fibrous polycarbonate can be coated onto a plate using a 3–1 dope in methylene chloride. Such a film has substantially the following characteristics.

Young's modulus _____ $3.00 \times 10^4$ kg./cm.$^2$.
Yield stress _____ 750 kg./cm.$^2$.
Tensile strength _____ 800 kg./cm.$^2$.
Elongation _____ 5 percent.
Flexibility (MIT folds) ____ 44.
Tear strength _____ 95 grams.
I.V. of the polymer _____ 0.52.
M.P. _____ 302° C.
Swell and shrink[1] _____ 0.06 percent (1.25° F.).
Heat distortion temperature _ Over 205° C. (Between 220 and 240° C.).

[1] Described in footnote to Table III.

Similar runs can be employed to give other tetrachloro Bisphenol A polycarbonates having properties illustrated in the following table; the use of tri-isoamyl amine as the catalyst produces similar results but with higher I.V.

In the data presented herein the flexibility test is a folds test using an M.I.T.-folding endurance tester made by Tinius Olsen; the technique employed is that originally designed for testing the flexibility of paper and now generally recognized as applicable to sheets of synthetic resins, viz. ASTM Method D 643–43.

The tear strength or Research Tear value is measured in grams and is based on using the Research Tear Tester, which is similar to the Elmendorf Tester, made by Thwing Albert. A rectangular specimen of a film is notched on a short side and grasped by two sets of jaws on either side of the notch. A slight slit is made at the apex of the notch with a knife. A pendulum is then released which moves one of the sets of jaws away from the other. The resistance to movement of the pendulum is measured in grams of tear resistance.

TABLE III

*Physical properties of films made by roll coating of a tetrachlorobisphenol A polycarbonate*

|  | Tetrachlorobisphenol A Polycarbonate | |
| --- | --- | --- |
|  | Along | Across |
| Thickness (in.) | 0.005 | 0.005 |
| Young's Modulus (kg./cm.$^2$) Values all $\times 10^4$ | 2.98 | 2.95 |
| Yield Stress (Kg./cm.$^2$) | 960 | 975 |
| Tensile Strength (Kg./cm.$^2$) | 960 | 975 |
| Elongation (percent) | 21 | 6 |
| Flexibility (MIT Folds) | 16 | 15 |
| Tear Strength (g.) | 52 | 60 |
| Heat Softening Temp (° C.) | Above 200° | Above 200° |
| Swell and Shrink (percent)[1] | 0.06 | 0.04 |

[1] The swell and shrink values were measured using 3 cycles of 0.5 hour in water at 125° F. and 1 hour at 125° F. in air.

EXAMPLE 7

The process described in Examples 5 and 6 can also be used to form a polycarbonate using an aqueous solution containing 70 mole percent of tetrachloro Bisphenol A and 30 percent of Bisphenol A. The copolymer obtained can then be coated to form a film having properties substantially as follows:

Young's modulus _____ $2.85 \times 10^4$ kg./cm.$^2$.
Yield and tensile strength _____ 825 kg./cm.$^2$.
Elongation _____ 5 percent.
Flexibility (MIT folds) _____ 40.
Tear strength _____ 106.
Heat softening temperature _____ 198° C.

EXAMPLE 8

The preceding processes can be further modified using a process as described in Example 5 except that 50 mole percent of the phosgene is replaced with adipyl dichloride.

EXAMPLE 9

The process described in Example 8 can be repeated except that oxalyl dichloride is used instead of the adipyl dichloride.

EXAMPLE 10.—HOMOPOLYCARBONATE FROM 4,4′-BIS (HYDROXYPHENYL)METHYL PHENYL METHANE

Twenty-five grams (0.86 mole) of 4,4′-bis(hydroxyphenyl)methyl phenyl methane is dissolved in 9.6 g. (0.24 mole) of sodium hydroxide in 115 ml. of distilled water. This solution is cooled to 15° C. and 90 ml. of distilled methylene chloride is added. With good stirring a solution of 9.4 g. (0.095 mole) of phosgene in 50 ml. of dry distilled methylene chloride is added within a period of 15 minutes at such a rate that the temperature does not exceed 15° C. After the addition 1 ml. of tri-n-butylamine is added. Stirring is continued to a point where the viscosity of the lower methylene chloride layer has reached a flow time of 85 seconds through a standard pipette. Enough glacial acetic acid is then added to neutralize the alkali. The methylene chloride solution of the polymer is then washed free of salts so that it gives a clear film when coated on a glass plate. The polymer was isolated by carefully precipitating the polymer by pouring the viscous dope into 3 volumes of methyl alcohol.

The yield of white fibrous polycarbonate was 86 percent of the theoretical value and it had an inherent viscosity of 0.77 in chloroform.

A clear film cast from a methylene chloride solution of this polymer had the following physical properties:

Young's modulus _____ $2.86 \times 10^4$ kg./cm.$^2$.
Yield and tensile _____ 715 kg./cm.$^2$.
Elongation _____ 5 percent.
Folds _____ 22.
Tear _____ 67.
Heat distortion temperature _____ 184° C.

EXAMPLE 11.—HOMOPOLYCARBONATE FROM 4,4'-BIS(HYDROXYPHENYL)METHYL-4-CHLOROPHENYL METHANE

Twenty-seven and nine-tenths grams (0.086 mole) of 4,4' - bis(hydroxyphenyl)methyl-4-chlorophenyl methane is dissolved in 9.6 g. (0.24 mole) of sodium hydroxide in 350 ml. of distilled water. This solution is cooled to 15° C. and 300 ml. of distilled methylene chloride is added. With good stirring, a solution of 9.4 g. (0.095 mole) of phosgene in 50 ml. of dry distilled methylene chloride is added within a period of 15 minutes, at such a rate that the temperature does not exceed 15° C. After the addition 0.5 ml. of tri-n-butylamine is added. Stirring is continued to a point where the viscosity of the lower methylene chloride layer has reached a flow time of 1 minute 35 seconds through a standard pipette. Enough glacial acetic acid is then added to neutralize the alkali. The methylene chloride solution of the polymer is washed free of salts so that it gives a clear film when coated on a glass plate. The polymer is isolated by carefully precipitating the polymer by pouring the viscous dope into three volumes of methyl alcohol.

The yield of white fibrous polymer was 90 percent of the theoretical value and it had an inherent viscosity of 0.5 in chloroform.

A clear film cast from a methylene cloride solution of this polymer had the following physical properties:

Young's modulus _____ $2.6 \times 10^4$ kg./cm.$^2$.
Yield and tensile _____ 640 kg./cm.$^2$.
Elongation _____ 5.5 percent.
Tear _____ 25.
Folds _____ 30.
Heat distortion temperature _____ 203° C.

Other experiments have been conducted using potassium hydroxide and sodium hydroxide and various modifications in the proportions of water, methylene chloride and catalysts. Good results were obtained using the catalysts of this invention in the continuous process described in the copending Humphlett et al. application mentioned above. Hence, the various aspects of this invention include continuous processes as well as the batch processes illustrated in most of the preceding examples.

In accordance with this invention there is provided a process for preparing a highly polymeric linear polyester of a bisphenol and a dibasic carboxylic acid having from 1 to 12 carbon atoms comprising (A) intermingling in a reaction zone at a temperature between 5° C. and 50° C. (1) an aqueous phase essentially composed of one mole proportion of a bisphenol dissolved in from 2 to 10 times its weight of water containing from 2.25 to 3.0 mole proportions of a hydroxide selected from the group consisting of sodium and potassium hydroxide, and (2) a non-aqueous phase essentially composed of from one half to about 16.7 times the weight of said bisphenol of an inert organic liquid containing at least 50% by volume of methylene chloride into which said polyester is dissolved as it is formed, said two-phase mixture containing from 0.05 to 5% based on the weight of the bisphenol of a trialkylamine wherein each alkyl radical is composed of a chain of 4 carbon atoms which contains substituents selected from the group consisting of hydrogen atoms, methyl radicals on the first three carbons of the chain and ethyl radicals on the first two carbons of the chain, (B) gradually adding a carbonyl dichloride compound to said two-phase mixture at the rate of about 0.2–1.0 moles per mole of said bisphenol per minute until a total of form 1.05 to 1.3 mole proportions have been added, (C) allowing the reaction to proceed for at least 2 minutes and until a polymer having substantially the maximum obtainable inehrent viscosity is attained, (D) reducing the pH to between 5 and 9, and (E) separating from the aqueous phase of the non-aqueous phase containing said desired polyester having an inherent viscosity as measured in chloroform of from 0.5 to 3.0 which value has a substantially inverse relationship with regard to the number of mole proportions of said hydroxide originally present in said two-phase mixture, said bisphenol containing from 13 to 40 carbon atoms and having the following general formula:

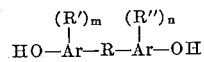

wherein R represents a hydrocarbon radical devoid of olefinic unsaturation containing from 1 to 20 carbon atoms selected from the group consisting of alkylene radicals, alkylidene radicals, and alkyl and aryl substituted alkylene and alkylidene radicals, each Ar represents an aromatic radical of the benzene and naphthalene series containing from 6 to 12 carbon atoms, the hydroxy radicals are attached in a position relative to R other than ortho to R, each of R' and R'' represents a member selected from the group consisting of halogen atoms, hydrogen atoms, alkyl radicals, nitro radicals and alkoxy radicals situated in the available positions with respect to R and the hydroxy radicals, and each of $n$ and $m$ represents a member of from 1 to 4.

The process just described is especially advantageous when the mole proportions of hydroxide is about 2.5 and the insert organic liquid is substantially entirely composed of methylene chloride. Preferred results are achieved when the carbonyl dichloride compound is phosgene and the rate is about 0.25 to about 0.30 mole of phosgene per mole of said bisphenol per minute. In most instances the preferred polycarbonates will include 50 mole percent of a 2,2-bis(4-hydroxyphenyl)propane such as Bisphenol A, or tetrachlorobisphenol A. For photographic purposes the desired polyester advantageously has an inherent viscosity of from about .0 to 1.8 (preferably 1.3–1.5 and especially 1.35–1.42) and can be produced within less than about ten minutes time of allowing the reaction to proceed as described above under step (C). As already indicated the most advantageous catalyst is tri-iso-amylamine.

The various bisphenols which can be employed in accordance with this invention include compounds which contain from 13 to 40 carbon atoms and have the general formula set forth above.

The specific names of a number of such compounds is illustrated by the disclosure in British Patent 772,627 and any of these compounds or mixtures can be employed in accordance with the present invention. Other examples are given elsewhere in the prior art.

The insert organic solvents which can be employed in accordance with this invention include aromatic and aliphatic hydrocarbons and chlorinated hydrocarbons containing from 1 to 10 or more carbon atoms such as methylene chloride, chloroform, chlorobenzene, toluene, etc., including mixtures of such compounds with each other or other such compounds as for example the freons, cyclohexane, iso-octane, benzene, xylene, etc.

The invention has been described in detail with particular reference to preferred embodiments thereof, but it will be understood that variations and modifications can be effected within the spirit and scope of the invention as described hereinabove and as defined in the appended claim.

I claim:

A process for preparing a highly polymeric linear polycarbonate of a bisphenol consisting of 2,2-bis(4-hydroxyphenyl) propane and phosgene comprising (A) admixing in a reaction zone at a temperature between 5° C. and 50° C. (1) an aqueous phase essentially composed of one mole proportion of said bisphenol dissolved in from 2 to 10 times its weight of water containing from 2.25 to 3.0 mole proportions of a hydroxide selected from the group consisting of sodium and potassium hydroxide, and (2) a non-aqueous phase essentially composed of from one half to about 16.7 times the weight of said bisphenol of an inert organic liquid capable of dissolving said polycarbonate, said two-phase mixture containing from 0.05 to 5% based on the weight of the bisphenol of tri-iso-amylamine, (B) gradually adding phosgene to said two-phase mixture at the rate of about 0.2–1.0 moles per mole of said bisphenol per minute until a total of from 1.05 to 1.3 mole proportions have been added, (C) allowing the reaction to proceed for at least 2 minutes and until a polycarbonate having substantially the maximum obtainable inherent viscosity is attained in no more than 30 minutes, and (D) separating from the aqueous phase the non-aqueous phase containing said desired polycarbonate having an inherent viscosity of from 0.5 to 3.0 as measured at 25° C. using 2.5 grams of polymer per liter dissolved in chloroform.

References Cited by the Examiner

UNITED STATES PATENTS

| | | | |
|---|---|---|---|
| 3,030,331 | 4/1962 | Goldberg | 260—47 X |
| 3,043,800 | 7/1962 | Schnell et al. | 260—47 X |
| 3,054,772 | 9/1962 | Jibben et al. | 260—47 X |

FOREIGN PATENTS

| | | |
|---|---|---|
| 808,490 | 2/1959 | Great Britain. |
| 809,735 | 3/1959 | Great Britain. |
| 546,375 | 3/1956 | Belgium. |

JOSEPH L. SCHOFER, *Primary Examiner.*

H. N. BURSTEIN, M. STERMAN, *Examiners.*